US009619386B2

(12) United States Patent
Maeda (10) Patent No.: US 9,619,386 B2
(45) Date of Patent: Apr. 11, 2017

(54) SYNCHRONIZATION VARIABLE MONITORING DEVICE, PROCESSOR, AND SEMICONDUCTOR APPARATUS (71) Applicant: Kabushiki Kaisha Toshiba, Minato-ku, Tokyo (JP)

(72) Inventor: Seiji Maeda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 65 days.

(21) Appl. No.: 14/727,229

(22) Filed: Jun. 1, 2015

(65) Prior Publication Data
US 2016/0224470 A1    Aug. 4, 2016

Related U.S. Application Data (60) Provisional application No. 62/109,475, filed on Jan. 29, 2015.

(51) Int. Cl.
| G06F 12/00 | (2006.01) |
| G06F 12/0831 | (2016.01) |
| G06F 12/0815 | (2016.01) |
| G06F 13/16 | (2006.01) |
| G06F 9/30 | (2006.01) |
| G06F 12/084 | (2016.01) |

(52) U.S. Cl.
CPC ...... *G06F 12/0831* (2013.01); *G06F 9/30087* (2013.01); *G06F 12/084* (2013.01); *G06F 12/0815* (2013.01); *G06F 13/1657* (2013.01); *G06F 13/1689* (2013.01); *G06F 2212/621* (2013.01)

(58) Field of Classification Search
CPC ............ G06F 12/0831; G06F 12/0815; G06F 12/084; G06F 13/1657; G06F 13/1689; G06F 2212/621; G06F 9/30087
See application file for complete search history.

(56) References Cited

U.S. PATENT DOCUMENTS

| 6,675,191 | B1 | 1/2004 | Ito |
| 7,552,290 | B2 | 6/2009 | Alsup |
| 7,606,985 | B2 | 10/2009 | Alsup |
| 7,627,722 | B2 | 12/2009 | Alsup |

(Continued)

FOREIGN PATENT DOCUMENTS

JP    2001-022720    1/2001

*Primary Examiner* — Shawn X Gu
(74) *Attorney, Agent, or Firm* — Knobbe, Martens, Olson & Bear, LLP (57) ABSTRACT According to an embodiment, a synchronization variable monitoring device includes: an address comparator configured to compare a received address included in an Invalidate Request, and an address that is set as an address of synchronization variable data upon receiving the Invalidate Request; a readout circuit configured to read out data of the address of the synchronization variable data when the received address and the address of the synchronization variable data coincide with each other; a conditional variable comparator configured to determine whether or not a predetermined condition is satisfied based on the data read out by the readout circuit; and a synchronization completion flag register configured to output a synchronization signal indicating that a synchronization condition is satisfied when the conditional variable comparator determines that the predetermined condition is satisfied.

20 Claims, 3 Drawing Sheets (56) References Cited

U.S. PATENT DOCUMENTS

| | | |
|---|---|---|
| 7,636,819 B2 | 12/2009 | Alsup |
| 7,853,756 B2 | 12/2010 | Ukai |
| 2007/0050561 A1 | 3/2007 | Alsup |
| 2007/0050563 A1 | 3/2007 | Alsup |

SYNCHRONIZATION VARIABLE MONITORING DEVICE, PROCESSOR, AND SEMICONDUCTOR APPARATUS

FIELD

An embodiment described herein relates generally to a synchronization variable monitoring device, a processor, and a semiconductor apparatus.

BACKGROUND

Conventionally, in an operation device such as a central processing unit (referred to as CPU below), a cache is used in order to access data necessary for an operation and processing in a short period of time.

The cache temporarily holds data on a main memory. Thus, when each operation device uses the cache, it is necessary to maintain coherence of the temporarily-held data among the caches. Since the plurality of operation devices are normally connected via an interconnect such as a bus, a cache coherent protocol is used in which cache coherence is maintained via the interconnect.

For example, an MESI protocol in which each data on a cache is managed in four types of states: Modified, Exclusive, Shared, and Invalid is employed as the cache coherent protocol. In the MESI protocol, Modified indicates that data is updated, Exclusive indicates that another cache does not hold the data, Shared indicates that the other cache holds the data, and Invalid indicates that the cache does not hold the data.

For example, a snoop request response method is employed as a method of appropriately managing a data state among the caches in the cache coherent protocol.

A snoop request is a request transmitted from a cache of an operation device that performs data access to another cache. A snoop response is a response transmitted from the cache receiving the request to the cache transmitting the request.

The snoop request includes a Read Request for requesting transmission of data when an operation device reads out data, and an Invalidate Request for requesting invalidation of data when an operation device writes data.

The snoop response includes a Read Unique Response, a Read Shared Response, and an Invalidated Response. The Read Unique Response indicates that the data is not held on another cache as a response to the Read Request. The Read Shared Response indicates that the data is held on the other cache. The Invalidated Response indicates that the data invalidation is completed as a response to the Invalidate Request.

When an operation device reads out data, the operation device uses data in a case in which the data is held in a cache of the operation device. The cache of the operation device transmits the Read Request together with an address of the data to the interconnect in a case in which the data is not held.

In a case in which another cache receiving the Read Request holds the data, the cache transmits the Read Shared Response together with the data to the interconnect. At this time, the data is held in both of the caches, so that a state of the data in both of the caches is Shared.

In a case in which all the caches receiving the Read Request do not hold the data, for example, the main memory transmits the Read Unique Response together with the data.

At this time, only the cache transmitting the Read Request holds the data, so that the state of the data in the cache is Exclusive.

When the operation device writes data, the following operation is performed according to a state of the data. In a case in which the state is Modified or Exclusive, the cache updates the data. In a case in which the state is Shared or Invalid, the cache transmits the Invalidate Request together with an address of the data, and is on standby until receiving the Invalidated Response.

In a case in which another cache receiving the Invalidate Request holds the data, the following operation is performed according to the state of the data. In a case in which the state is Modified, the other cache transmits the Invalidated Response after writing the data into the main memory. In a case in which the state is Exclusive or Shared, the other cache transmits the Invalidated Response after invalidating the data. In a case in which the state is Invalid, the other cache transmits the Invalidated Response. At this time, the data state of the cache is Invalid. The cache receiving the Invalidated Response transmits the Read Request, and acquires and updates the data when the data state is Invalid. The data state of the cache updating the data is Modified.

As described above, coherence of data among the caches is maintained by the cache coherent protocol.

By the way, when the plurality of operation devices perform processing in association, it is necessary to synchronize the processing. For example, an acquire release method of performing synchronization based on the cache coherent protocol is employed as a method of synchronization among the plurality of operation devices including the caches.

In the acquire release method, before updating a synchronization variable in data, an operation device requests Acquire of the synchronization variable at the time of reading out the synchronization variable. A cache of the operation device holds the data in which the synchronization variable is included, records that Acquire is requested, and, for example, changes an Acquire flag of a line including the data to "1". After that, when a state of the data is changed to Invalid by another operation device rewriting the data, the record that Acquire is requested is deleted. For example, the Acquire flag is changed to "0" from "1".

When updating the synchronization variable, the operation device requests Release for the cache as well as transmitting the updated data. When the Acquire request is recorded (for example, when the Acquire flag is "1"), the cache changes the synchronization variable by the updated data, and notifies the operation device that the Release request succeeds. However, when the Acquire request is not recorded (for example, when the Acquire flag is "0"), the cache discards the updated data, and notifies the operation device that the Release request fails. When the Release request fails, the operation device retries to update the synchronization variable.

When processing using the synchronization variable is performed, the processing is put on standby until the synchronization variable satisfies specific conditions. Examples of the conditions include that the synchronization variable has a specific value, a specific bit of the synchronization variable is 1, and all bits of the synchronization variable are 1.

Normally, when the operation device is on standby for synchronization without performing processing, the operation device is caused to transition to a power saving mode from a normal mode until a value of the synchronization variable is changed in order to reduce power consumption.

The normal mode is a mode in which operation processing can be executed. The power saving mode is a mode in which the operation processing is suspended. By stopping the clock or cutting off the power supply to the operation device, power consumption of the operation device can be reduced.

Particularly, when processing is synchronized based on the cache coherent protocol, the cache is required in the operation device that performs processing synchronization. A circuit scale and power consumption of a semiconductor apparatus on which the operation device is mounted are disadvantageously increased.

Moreover, when processing is put on standby by using the synchronization variable, the synchronization conditions may not be satisfied even when the synchronization variable is changed. Even in such a case, the operation device is restored to the normal mode from the power saving mode, so that power consumption regarding mode transition is disadvantageously increased. For example, when the operation device confirms transmission and reception of the Invalidate Request between the caches, the operation device is restored to the normal mode from the power saving mode even when the value of the synchronization variable does not satisfy the conditions of the synchronization, in other words, even before the conditions of the synchronization are satisfied. Thus, power consumption is increased.

DETAILED DESCRIPTION

A synchronization variable monitoring device of an embodiment includes: a first comparator configured to compare a first address included in an update notice signal for a cache line, and a second address that is an address of a synchronization variable upon receiving the update notice signal for the cache line; a readout circuit configured to read out data of the second address when the first address and the second address coincide with each other; a condition determination circuit configured to determine whether or not a predetermined condition is satisfied based on the read-out data; and a synchronization signal output circuit configured to output a synchronization signal when it is determined that the predetermined condition is satisfied.

A processor of the embodiment includes a synchronization variable monitoring device, and an operation device capable of operating based on a synchronization signal output from the synchronization variable monitoring device. The synchronization variable monitoring device includes: a first comparator configured to compare a first address included in an update notice signal for a cache line, and a second address that is an address of a synchronization variable upon receiving the update notice signal for the cache line; a readout circuit configured to read out data of the second address when the first address and the second address coincide with each other; a condition determination circuit configured to determine whether or not a predetermined condition is satisfied based on the read-out data; and a synchronization signal output circuit configured to output the synchronization signal when it is determined that the predetermined condition is satisfied.

A semiconductor apparatus of the embodiment includes a first processor including a synchronization variable monitoring device and a first operation device capable of operating based on a synchronization signal output from the synchronization variable monitoring device, a second processor including a second operation device and a first cache, and an interconnect configured to connect the first processor and the second processor. The synchronization variable monitoring device includes: a first comparator configured to compare a first address included in an update notice signal for a cache line, and a second address that is an address of a synchronization variable upon receiving the update notice signal for the cache line; a readout circuit configured to read out data of the second address when the first address and the second address coincide with each other; a condition determination circuit configured to determine whether or not a predetermined condition is satisfied based on the read-out data; and a synchronization signal output circuit configured to output the synchronization signal when it is determined that the predetermined condition is satisfied.

In the following, a computing system of the embodiment is described.

(Configuration of the Computing System)

Figure 1:
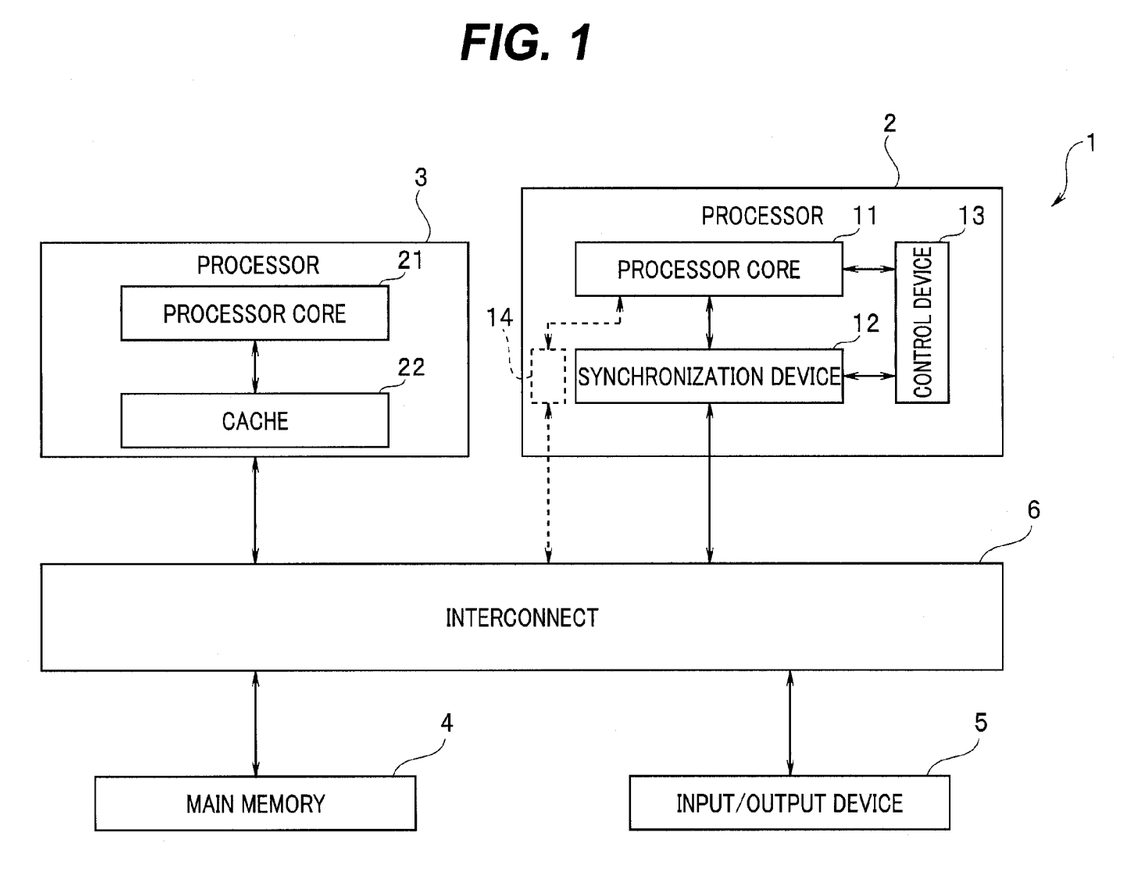
FIG. 1 is a block diagram illustrating a configuration of a computing system 1 of the present embodiment.

FIG. 1 is a block diagram illustrating a configuration of a computing system 1 of the present embodiment. The computing system 1 includes a first processor 2, a second processor 3, a main memory 4, an input/output device 5, and an interconnect 6. As shown in FIG. 1, the processors 2 and 3 or the like are connected together via the interconnect 6 such as a bus.

Here, a whole or a portion of the computing system 1 is achieved by an SoC (system on chip) semiconductor apparatus.

The first processor 2 executes predetermined processing in synchronization with processing of the processor 3. The first processor 2 includes a processor core 11 that is an operation device, a synchronization device 12, and a control device 13.

The second processor 3 includes a processor core 21, and a cache 22. The cache 22 is a cache memory suitable for a cache coherent protocol for achieving cache coherence between the processors. Here, for example, a state of each data on the cache 22 is managed by a snoop request response method, so that cache coherence is maintained.

As described above, the computing system 1 includes the first processor 2 having the processor core 11 that is an operation device and the synchronization device 12, and the second processor 3 having the processor core 21 that is an operation device and the cache 22. The first and second processors 2 and 3 are connected via the interconnect 6 so as to enable data transmission and reception.

The main memory 4 is a memory such as a DRAM. The respective processors 2 and 3 can read out data stored in the main memory 4, and can write data into the main memory 4 via the interconnect 6.

The input/output device 5 is an interface for data input/output. Various data is input to the input/output device 5 from an external equipment, and the input/output device 5 outputs various data for display, transmission, or the like.

The processor core 11 of the first processor 2 is an operation device that includes a central processing unit (CPU) or the like, and executes predetermined processing in synchronization with processing of another processor by setting an address of a synchronization variable and a condition in the synchronization device 12.

For example, the processor core 11 is a circuit capable of executing a program. The processor core 11 also executes processing in synchronization with processing of another processor while executing the program. The processor core 11 comes into a standby state of waiting for synchronization while executing the predetermined program, and synchronizes with the other processor by resuming execution of the predetermined program upon completion of predetermined processing in the other processor.

The synchronization device 12 is a circuit that is connected to the interconnect 6, and achieves synchronization between the processor core 11 and the other processor based on information acquired via the interconnect 6.

The control device 13 is a circuit that controls an operation mode of the processor core 11 according to an output of the synchronization device 12. When synchronization conditions in the synchronization device 12 are not satisfied and the processor core 11 is in a standby state, the control device 13 causes the processor core 11 to transition to a power saving mode. When the synchronization conditions are satisfied, the control device 13 causes the processor core 11 to transition to a normal mode.

Therefore, according to the output of the synchronization device 12, the processor core 11 suspends processing and transitions into the power saving mode in the standby state, and is restored to the normal mode and resumes the processing when the synchronization conditions are satisfied.

Note that the control device 13 may be included in the synchronization device 12 although the control device 13 is a separate circuit from the synchronization device 12 in the present embodiment.

Although only the second processor 3 includes the cache in FIG. 1, another processor including the cache may be employed. That is, the computing system 1 may include a plurality of second processors 3. When the plurality of processors are connected to the interconnect 6, the computing system 1 can achieve cache coherence among the plurality of processors.

(Configuration of the Synchronization Device)

Figure 2:
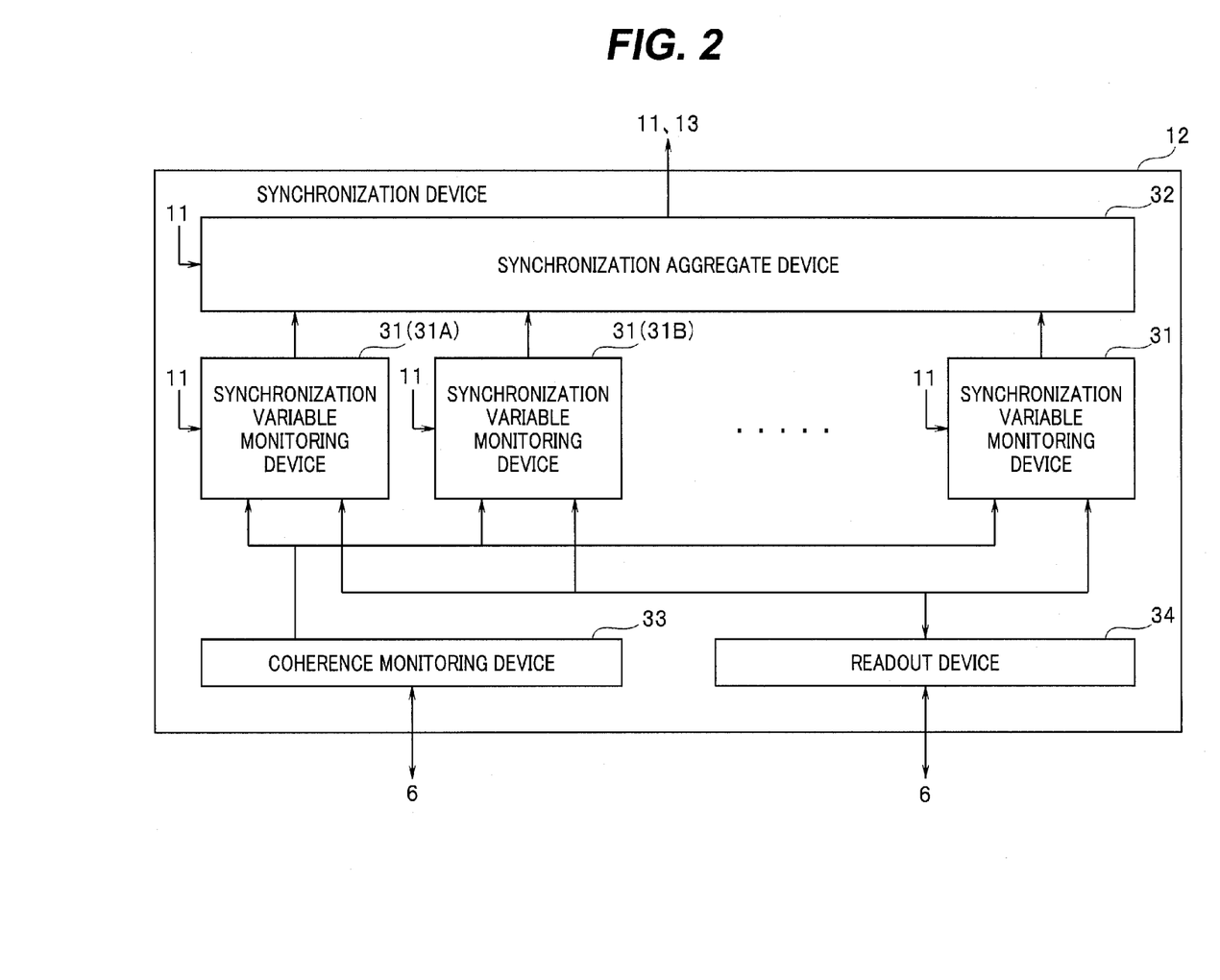
FIG. 2 is a block diagram illustrating a configuration of a synchronization device 12 of the present embodiment.

FIG. 2 is a block diagram illustrating a configuration of the synchronization device 12.

The synchronization device 12 includes a plurality of synchronization variable monitoring devices 31, a synchronization aggregate device 32, a coherence monitoring device 33, and a readout device 34.

Note that the synchronization device 12 may include only one synchronization variable monitoring device 31, or only one of the plurality of synchronization variable monitoring devices 31 may be operated when the number of synchronization variables to be monitored is one although the synchronization device 12 includes the plurality of synchronization variable monitoring devices 31 in the present embodiment.

Each of the synchronization variable monitoring devices 31 is a circuit that monitors whether or not the synchronization variable satisfies the synchronization condition set by the processor core 11. Here, the synchronization variable monitoring device 31 is provided for each synchronization variable.

The synchronization aggregate device 32 monitors states of the plurality of synchronization variable monitoring devices 31. The synchronization aggregate device 32 determines whether or not the synchronization conditions are satisfied based on synchronization signals from all or some of the synchronization variable monitoring devices 31. When determining that the synchronization conditions are satisfied, the synchronization aggregate device 32 outputs an aggregate flag, that is, an aggregate signal indicating whether or not the synchronization conditions are satisfied to the processor core 11 and the control device 13. That is, the synchronization aggregate device 32 constitutes an aggregate signal output circuit that outputs an aggregate signal indicating synchronization based on the plurality of synchronization signals output from the plurality of synchronization variable monitoring devices 31.

Note that when the number of the synchronization conditions is one, the synchronization aggregate device 32 may not be provided.

The control device 13 outputs a control signal for causing the processor core 11 to transition from the power saving mode to the normal mode upon receiving the aggregate signal. The processor core 11 resumes the suspended processing according to the control signal.

The coherence monitoring device 33 is a circuit that receives a snoop request (here, an Invalidate Request) for the first processor 2 from the interconnect 6, notifies the respective synchronization variable monitoring devices 31 of address information (a first address) of a processing object included in the snoop request, and transmits a snoop response (here, an Invalidated Response). The address information is an address of the processing object, e.g., an address of data that the other processor core accesses. The snoop request is a signal used in the snoop request response method. The Invalidate Request is a signal that gives an update notice for a cache line in which coherence of data on the cache is maintained by the cache coherent protocol (referred to as an update notice signal below), in other words, an invalidate request signal for a cache line used in the cache coherent protocol.

That is, the coherence monitoring device 33 is a reception circuit that receives the snoop request that is the update notice signal from the interconnect, and is a circuit that monitors a state of data on cache by the cache coherence protocol.

The readout device 34 is a circuit that acquires data of an address specified in the synchronization variable monitoring device 31, that is, the synchronization variable from the main memory 4 or the cache 22 of the second processor 3 via the interconnect 6.

(Configuration of the Synchronization Variable Monitoring Device)

Figure 3:
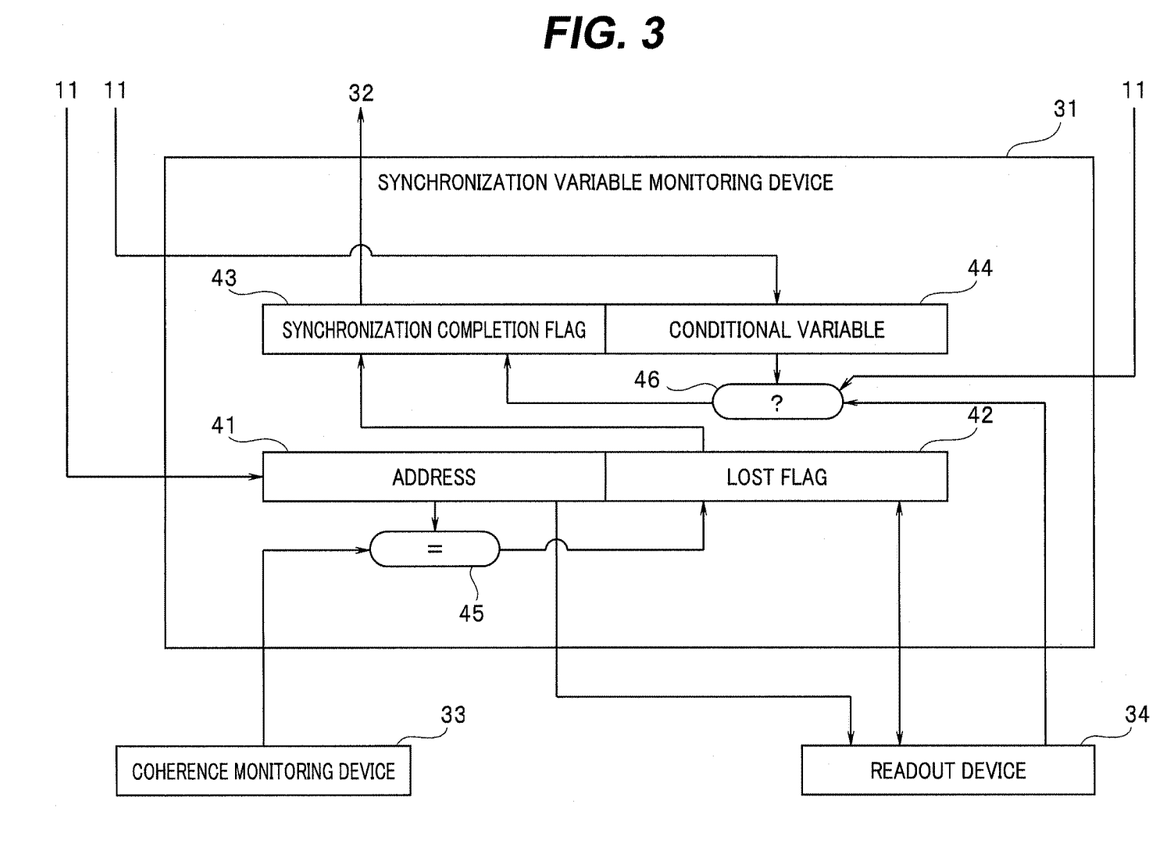
FIG. 3 is a block diagram illustrating a configuration of a synchronization variable monitoring device 31 of the present embodiment.

FIG. 3 is a block diagram illustrating a configuration of each of the synchronization variable monitoring devices 31.

Each of the synchronization variable monitoring devices 31 includes an address register 41, a lost flag register 42, a synchronization completion flag register 43, a conditional variable register 44, an address comparator 45, and a conditional variable comparator 46.

The address register 41 holds the address (a second address) of the synchronization variable set from the processor core 11. The address of the synchronization variable is an address on a memory space of the computing system 1.

The lost flag register 42 holds a lost flag indicating that data in which the synchronization variable is included is invalidated in the cache coherent protocol.

The synchronization completion flag register 43 holds a synchronization completion flag indicating that a predetermined condition is satisfied, that is, synchronization is completed.

The conditional variable register 44 holds a conditional variable that is used for comparing a synchronization completion condition.

The address comparator 45 denoted by "=" in FIG. 3 is a circuit that compares the address notified from the coherence monitoring device 33, and the address in the address register 41, and when the addresses coincide with each other, validates the lost flag.

For example, the lost flag is "0" by default. When the lost flag is validated, the lost flag is changed into "1". That the lost flag is validated means that the synchronization variable is possibly changed by the processing of the other processor.

When the lost flag is changed into "1", the readout device 34 reads out data held in the address, that is, the synchronization variable from the main memory 4, outputs the synchronization variable to the conditional variable comparator 46, and also invalidates the lost flag of the lost flag register 42.

Note that when the lost flag is validated, the synchronization completion flag of the synchronization completion flag register 43 is canceled.

The conditional variable comparator 46 indicated by "?" in FIG. 3 is a circuit that compares the synchronization variable notified from the readout device 34, and the conditional variable in the conditional variable register 44 on the condition set from the processor core 11, and when the condition is satisfied, validates the synchronization completion flag of the synchronization completion flag register 43 (for example, changes the synchronization completion flag to "1").

For example, conditions that the synchronization variable and the conditional variable are identical, a result of a logical product of the synchronization variable and the conditional variable is identical with the conditional variable, and one or more bits of the result of the logical product of the synchronization variable and the conditional variable are 1 are used as the condition.

The synchronization completion flag is monitored by the synchronization aggregate device 32. The synchronization aggregate device 32 can detect that the synchronization variable of the synchronization variable monitoring device 31 satisfies the condition when the synchronization completion flag is validated.

(Action)

Operation when the first processor 2 performs processing synchronization is described.

In the computing system 1, predetermined processing is being executed by the first and second processors 2 and 3. In the following, for the purpose of simplifying a description, operation of the computing system 1 is described by using an example of synchronization processing in which the first processor 2 executes processing when certain data A has a predetermined value A1 and certain data B has a predetermined value B1 during processing of the second processor 3.

The processor core 11 sets the synchronization conditions in the synchronization aggregate device 32 before starting the processing. For example, information indicating that the synchronization conditions are satisfied when the synchronization completion flag of a synchronization variable monitoring device 31A is valid, and the synchronization completion flag of a synchronization variable monitoring device 31B is valid is set in the synchronization aggregate device 32.

Furthermore, the processor core 11 sets the address of the synchronization variable, the conditional variable, and the synchronization condition in each of the synchronization variable monitoring devices 31A and 31B. For example, the processor core 11 sets an address of the data A on the memory space as the address of the synchronization variable, sets a predetermined value A1 "111" as the conditional variable, and sets that the synchronization variable of the data A and the conditional variable coincide with each other as the synchronization condition in the synchronization variable monitoring device 31A. Moreover, the processor core 11 sets an address of the data B on the memory space as the address of the synchronization variable, sets a predetermined value B1 "222" as the conditional variable, and sets that the synchronization variable of the data B and the conditional variable coincide with each other as the synchronization condition in the synchronization variable monitoring device 31B.

When the computing system 1 starts the processing, the second processor 3 executes the specified processing. On the other hand, the first processor 2 executes the processing in synchronization with the second processor 3. Here, the first processor 2 comes into a synchronization waiting state at the same time as starting the processing, or during the processing. In the synchronization waiting state, the processor core 11 comes into a standby mode that is the power saving mode, and supply of a clock signal or power supply to the processor core 11 is stopped.

The synchronization aggregate device 32 also notifies the processor core 11 and the control device 13 of a synchronization flag in the synchronization waiting state. The processor core 11 and the control device 13 can determine whether or not the synchronization conditions are satisfied according to the synchronization flag. The synchronization flag indicates whether the synchronization conditions of the first processor 2 are satisfied or not.

According to the synchronization flag, the processor core 11 interrupts the processing in the case of the standby state, and resumes the processing when the synchronization processing is completed, that is, when the synchronization conditions are satisfied. According to the synchronization flag, the control device 13 causes the processor core 11 to transition to the power saving mode in the case of the standby state, and causes the processor core 11 to transition to the normal mode when the synchronization processing is completed.

When receiving the Invalidate Request, the coherence monitoring device 33 outputs the first address (for example, an address of data that the other processor core is to update) included in the Invalidate Request to the synchronization variable monitoring devices 31A and 31B, and transmits the Invalidated Response to the interconnect 6.

The address comparator 45 compares the first address and the second address held in the address register 41. When the addresses are identical, the address comparator 45 validates the lost flag, and invalidates the synchronization completion flag. That the addresses are identical means that the synchronization variable is possibly rewritten by the second processor 3.

When the lost flag is valid, the synchronization variable monitoring device 31 instructs the readout device 34 to read out the data of the second address, that is, the synchronization variable. That is, the readout device 34 is a readout circuit that reads out the data of the second address when the first address and the second address coincide with each other.

The readout device 34 reads out the synchronization variable stored in the specified address of the main memory 4 or the cache 22 of the second processor 3, outputs the synchronization variable to the synchronization variable monitoring device 31 instructing the readout of the synchronization variable, and invalidates the lost flag of the synchronization variable monitoring device 31.

The conditional variable comparator 46 of the synchronization variable monitoring device 31 compares the synchronization variable and the conditional variable according to the condition. Examples of the condition include that the synchronization variable has a specific value, a specific bit of the synchronization variable is 1, and all bits of the synchronization variable are 1. When the synchronization condition is satisfied, the synchronization completion flag is validated. The synchronization completion flag of "1" indicating valid is the synchronization signal to the synchronization aggregate device 32.

That is, the conditional variable comparator 46 is a condition determination circuit that determines whether or not the predetermined condition is satisfied based on the data read out by the readout device 34. The synchronization completion flag register 43 constitutes a synchronization signal output circuit that outputs the synchronization signal indicating that the synchronization condition is satisfied when the conditional variable comparator 46 determines that the predetermined condition is satisfied.

The synchronization completion flags of the respective synchronization variable monitoring devices 31 are aggregated in the synchronization aggregate device 32. The synchronization aggregate device 32 determines whether or not the set synchronization conditions are satisfied based on the synchronization completion flags of one or two or more synchronization variable monitoring devices 31.

When the synchronization aggregate device 32 determines that the synchronization conditions are satisfied, in the example above, when the data A has the predetermined value A1 "111" and the data B has the predetermined value B1 "222", the synchronization flag, that is, the aggregate signal, is "1". As a result, the processor core 11 transitions to the normal mode from the power saving mode.

The processor core 11 does not transition to the normal mode when the data A is updated to a value where the condition of the predetermined value A1 "111" is not satisfied, or the data B is updated to a value where the condition of the predetermined value B1 "222" is not satisfied. Moreover, the processor core 11 does not transition to the normal mode when the condition that the data A has the predetermined value A1 "111" is only satisfied, or the condition that the data B has the predetermined value B1 "222" is only satisfied. The processor core 11 is in the standby state in the power saving mode until the synchronization conditions that the data A has the predetermined value A1 "111" and the data B has the predetermined value B1 "222" are satisfied, so that power consumption of the first processor 2 can be reduced.

As long as the first processor 2 includes the synchronization device 12, the first processor 2 can execute the predetermined processing in synchronization with the processing of the other processor 3 even when the first processor 2 does not include the cache, so that a circuit scale of the first processor 2 can be decreased.

Therefore, the first processor 2 is a synchronization device that achieves power saving and reduces a circuit scale of the semiconductor apparatus by holding only minimum information necessary for synchronization and further performing conditional determination in a synchronization function using the cache coherent protocol by the interconnect. Particularly, the first processor 2 that performs the processing synchronization uses the address of the synchronization variable included in the update notice signal and the conditional variable, and only when the synchronization variable satisfies the predetermined conditions, the processor core 11 is restored from the power saving mode.

As described above, in accordance with the present embodiment, it is possible to provide the variable monitoring device, the processor, and the semiconductor apparatus for performing the processing synchronization by use of a mechanism of the cache coherent protocol, the variable monitoring device, the processor, and the semiconductor apparatus capable of reducing power consumption and a circuit scale of the operation device.

Note that the first processor 2 may include the cache although the first processor 2 does not include the cache in the above embodiment. For example, the first processor 2 may include a cache 14 as indicated by a dotted line in FIG. 1. In this case, the processor core 11 uses the synchronization device 12 so as to perform the processing synchronization, and uses the cache 14 so as to perform data access. When the processor core 11 performs only the processing synchronization without performing the data access, the cache 14 is not operated. Thus, the processor 2 operates by saving power.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A synchronization variable monitoring device comprising:
   a first comparator configured to compare a first address included in an update notice signal for a cache line, and a second address that is an address of a synchronization variable upon receiving the update notice signal;
   a readout circuit configured to read out data of the second address when the first address and the second address coincide with each other;
   a condition determination circuit configured to determine whether or not a predetermined condition is satisfied based on the read-out data; and
   a synchronization signal output circuit configured to output a synchronization signal when it is determined that the predetermined condition is satisfied.

2. The synchronization variable monitoring device according to claim 1,
   wherein the update notice signal is an invalidate request signal for a cache line used in a cache coherent protocol.

3. A synchronization variable monitoring apparatus, comprising:
   the synchronization variable monitoring device according to claim 1 in plurality, and
   an aggregate signal output circuit configured to output an aggregate signal indicating synchronization based on synchronization signals output from the synchronization variable monitoring devices.

4. The synchronization variable monitoring device according to claim 1, further comprising:
   a reception circuit configured to receive the update notice signal from an interconnect.

5. The synchronization variable monitoring device according to claim 4, wherein the reception circuit is a coherence monitoring circuit configured to monitor a state of data on a cache by a cache coherent protocol.

6. The synchronization variable monitoring device according to claim 5,
wherein the update notice signal is a snoop request signal used in a snoop request response method.

7. A processor comprising:
a synchronization variable monitoring device, and
an operation device configured to operate based on a synchronization signal output from the synchronization variable monitoring device, wherein
the synchronization variable monitoring device comprising:
a first comparator configured to compare a first address included in an update notice signal for a cache line, and a second address that is an address of a synchronization variable upon receiving the update notice signal;
a readout circuit configured to read out data of the second address when the first address and the second address coincide with each other;
a condition determination circuit configured to determine whether or not a predetermined condition is satisfied based on the read-out data; and
a synchronization signal output circuit configured to output the synchronization signal when it is determined that the predetermined condition is satisfied.

8. The processor according to claim 7,
wherein the update notice signal is an invalidate request signal for a cache line used in a cache coherent protocol.

9. The processor according to claim 7, comprising:
a synchronization variable monitoring apparatus comprising the synchronization variable monitoring device in plurality, and
an aggregate signal output circuit configured to output an aggregate signal indicating synchronization based on synchronization signals output from the synchronization variable monitoring devices.

10. The processor according to claim 7, further comprising:
a reception circuit configured to receive the update notice signal from an interconnect.

11. The processor according to claim 10,
wherein the reception circuit is a coherence monitoring circuit configured to monitor a state of data on a cache by a cache coherent protocol.

12. The processor according to claim 11,
wherein the update notice signal is a snoop request signal used in a snoop request response method.

13. The processor according to claim 7, further comprising:
a cache.

14. A semiconductor apparatus comprising:
a first processor including a synchronization variable monitoring device and a first operation device capable of operating based on a synchronization signal output from the synchronization variable monitoring device,
a second processor including a second operation device and a first cache, and
an interconnect configured to connect the first processor and the second processor, wherein
the synchronization variable monitoring device comprising:
a first comparator configured to compare a first address included in an update notice signal for a cache line, and a second address that is an address of a synchronization variable upon receiving the update notice signal;
a readout circuit configured to read out data of the second address when the first address and the second address coincide with each other;
a condition determination circuit configured to determine whether or not a predetermined condition is satisfied based on the read-out data; and
a synchronization signal output circuit configured to output the synchronization signal when it is determined that the predetermined condition is satisfied.

15. The semiconductor apparatus according to claim 14,
wherein the update notice signal is an invalidate request signal for a cache line used in a cache coherent protocol.

16. The semiconductor apparatus according to claim 14, comprising:
a synchronization variable monitoring apparatus comprising the synchronization variable monitoring device in plurality, and
an aggregate signal output circuit configured to output an aggregate signal indicating synchronization based on synchronization signals output from the synchronization variable monitoring devices.

17. The semiconductor apparatus according to claim 14, further comprising:
a reception circuit configured to receive the update notice signal from the interconnect.

18. The semiconductor apparatus according to claim 17,
wherein the reception circuit is a coherence monitoring circuit configured to monitor a state of data on a cache by a cache coherent protocol.

19. The semiconductor apparatus according to claim 18,
wherein the update notice signal is a snoop request signal used in a snoop request response method.

20. The semiconductor apparatus according to claim 14,
wherein the first processor includes a second cache.

* * * * *